(12) United States Patent
Lebedev et al.

(10) Patent No.: US 8,934,318 B2
(45) Date of Patent: Jan. 13, 2015

(54) SYSTEM AND METHOD FOR FISH FINDING USING A SONAR DEVICE AND A REMOTE COMPUTING DEVICE

(75) Inventors: Alexander Lebedev, Seattle, WA (US); Tim Etchells, Kenmore, WA (US)

(73) Assignee: ReelSonar, Inc., Kenmore, WA (US)

( * ) Notice: Subject to any disclaimer, the term of this patent is extended or adjusted under 35 U.S.C. 154(b) by 335 days.

(21) Appl. No.: 13/552,250

(22) Filed: Jul. 18, 2012

(65) Prior Publication Data

US 2014/0022864 A1 Jan. 23, 2014

(51) Int. Cl.
*G01S 15/96* (2006.01)

(52) U.S. Cl.
USPC .......................................................... 367/7

(58) Field of Classification Search
CPC ................................. G01S 7/003; G01S 15/96
USPC .......................................... 367/107, 111, 88
See application file for complete search history.

(56) References Cited

U.S. PATENT DOCUMENTS

| | | | | |
|---|---|---|---|---|
| 5,159,579 A | * | 10/1992 | Nagashima et al. | 367/111 |
| 6,595,315 B1 | * | 7/2003 | Fujimoto et al. | 367/111 |
| 2005/0162976 A1 | * | 7/2005 | Kuriyama et al. | 367/111 |
| 2007/0147173 A1 | * | 6/2007 | Park | 367/107 |
| 2011/0202278 A1 | * | 8/2011 | Caute et al. | 702/14 |
| 2011/0260860 A1 | * | 10/2011 | Gupta | 340/539.13 |
| 2013/0016586 A1 | * | 1/2013 | Craig | 367/107 |
| 2014/0003193 A1 | * | 1/2014 | Schmidt et al. | 367/88 |
| 2014/0022864 A1 | * | 1/2014 | Lebedev | 367/107 |
| 2014/0057677 A1 | * | 2/2014 | Liubinas et al. | 367/87 |
| 2014/0071167 A1 | * | 3/2014 | Lauenstein et al. | 345/634 |

FOREIGN PATENT DOCUMENTS

WO  WO 2008115175 A1 * 9/2008

* cited by examiner

*Primary Examiner* — Daniel Pihulic
(74) *Attorney, Agent, or Firm* — James M. Smedley LLC

(57) ABSTRACT

The present invention generally relates to a fish finding sonar system. Specifically, this invention relates to a sonar device pairing with a remote computing device to provide information to an angler about what is under the surface of the water. Embodiments of the present invention include a sonar device and a remote computing device configured to allow the sonar device to wirelessly communicate with the remote computing device and the remote computing device to connect to a database to register and receive information about real-time fishing hotspots.

17 Claims, 6 Drawing Sheets

SYSTEM AND METHOD FOR FISH FINDING USING A SONAR DEVICE AND A REMOTE COMPUTING DEVICE

FIELD OF THE INVENTION

The present invention generally relates to a fish finding sonar system. Specifically, this invention relates to a sonar device pairing with a remote computing device to provide information to an angler about what is under the surface of the water. Certain embodiments of the present invention include a sonar device and a remote computing device configured to allow the sonar device to wirelessly communicate with the remote computing device and the remote computing device to connect to a database to register and receive information about real-time fishing hotspots.

BACKGROUND OF THE INVENTION

For centuries, fishermen have been looking for ways to improve their chances for catching fish. Over the years, there have been developments in lures, rods, reels, and a variety of other equipment that have made fishermen more successful. Over the past two decades, however, fish finding sonar systems have become increasingly available and fishermen have taken advantage of the benefits those systems offer.

Fish finding sonar systems are available in a variety of forms and functionalities, which give fisherman a broad choice as to what product fits their specific needs. In more recent times, fish finding sonar systems that can pair the fish finding sonar device together with the numerous remote computing devices that fishermen and others already use every day have become available to the public. Such an arrangement allows a fisherman to utilize an already existing display screen rather than having to have one that is dedicated to the fish finding sonar alone.

These fish finding sonar devices currently available, however, do have limitations, specifically in relation to the fish finding sonar devices that pair a sonar fish finder with a remote computing device. Currently available fish finding sonar systems do not offer the capacity for fishermen to track real-time fishing hotspots. Such a limitation can decrease a fisherman's ability to successfully catch fish, as the fisherman is unaware where fish are actually located and therefore must use valuable time to search for the fish.

Further, currently available fish finding sonar systems require that sonar data be processed and manipulated by the remote computing devices. This requires the remote computing device to be configured to receive a constant or near-constant stream of raw data from a sonar means. The remote computing device in this configuration is then utilizing a significant portion of its resources receiving data communications and processing raw data into useful data. This utilization of resources lowers the capacity of the remote computing device to perform other tasks and also works to diminish battery life which is a constant issue with remote computing devices.

Therefore, there is a need in the art for a fish finding sonar system and method that does not require the utilization of significant resources on a remote computing device in order to provide useful sonar data to the remote computing device. These and other features and advantages of the present invention will be explained and will become obvious to one skilled in the art through the summary of the invention that follows.

SUMMARY OF THE INVENTION

Accordingly, it is an object of the present invention to provide a system and method for fish finding using sonar and a remote computing device whereby the resources of the remote computing device are not tasked by the process.

According to an embodiment of the present invention, a system for processing and transmitting sonar data includes: a sonar device, including a sonar sensor, a processor, a first wireless communication means, and a housing, wherein the housing is configured to retain the sonar sensor, microprocessor and the first wireless communications means, wherein the processor is configured to processes sonar data received from the sonar sensor, wherein the processor is communicatively connected to the first wireless communication means; and a remote computing device, wherein the remote computing device comprises a display component and a second wireless communication means, wherein the second communication means of the remote computing device is configured to communicate wirelessly with the first communication means of the sonar device, wherein the first communication means of the sonar device is configured to receive processed sonar information from the processor and transmit the processed sonar information to the second communication means of the remote computing device.

According to an embodiment of the present invention, the sonar device further includes a storage device.

According to an embodiment of the present invention, the sonar device further includes an accelerometer.

According to an embodiment of the present invention, the sonar device further includes an indicator light.

According to an embodiment of the present invention, the sonar device further includes an auditory signal.

According to an embodiment of the present invention, the sonar device further includes a thermometer.

According to an embodiment of the present invention, the sonar device further includes a speed sensor.

According to an embodiment of the present invention, the sonar device further includes a conductivity sensor.

According to an embodiment of the present invention, the sonar device is further configured to provide synthetic aperture sonar imaging.

According to an embodiment of the present invention, the first wireless communications means is low energy Bluetooth.

According to an embodiment of the present invention, the second wireless communications means is low energy Bluetooth.

According to an embodiment of the present invention, the power source is rechargeable.

According to an embodiment of the present invention, the housing is plastic.

According to an embodiment of the present invention, the housing is waterproof.

According to an embodiment of the present invention, a method for fish finding using sonar and a remote computing device includes the steps of: collecting sonar data at a sonar sensor of a sonar device, processing sonar data at a processor of the sonar device, transmitting the processed sonar data from a first communication means of the sonar device to a second communication means of a remote computing device, and displaying the processed sonar data on a display of the remote computing device, wherein the processed sonar data identifies information regarding one or more fish.

According to an embodiment of the present invention, the method may include the step of a remote computing system receiving said processed sonar data from said remote computing device.

According to an embodiment of the present invention, the method may include the step of said remote computing system analyzing said processed sonar data to develop hotspot information.

According to an embodiment of the present invention, the method may include the step of said remote computing system communicating said hotspot information to said remote computing device.

According to an embodiment of the present invention, a method for generating hotspot information, the method includes the steps of: determining available fishing data points, creating an independent variable for each available fishing data point, generating an initial base model based at least in part upon the independent variables, applying a reasoning engine to processed sonar data received from at least one remote computing device, wherein the reasoning engine uses statistical analysis to compare the initial base model to the processed sonar data, and generating the hotspot information, wherein said hotspot information identifies predicted fishing trends.

According to an embodiment of the present invention, the method may include the step of logging the hotspot information in a data store.

The foregoing summary of the present invention with the preferred embodiments should not be construed to limit the scope of the invention. It should be understood and obvious to one skilled in the art that the embodiments of the invention thus described may be further modified without departing from the spirit and scope of the invention.

DETAILED SPECIFICATION

Figure 1:
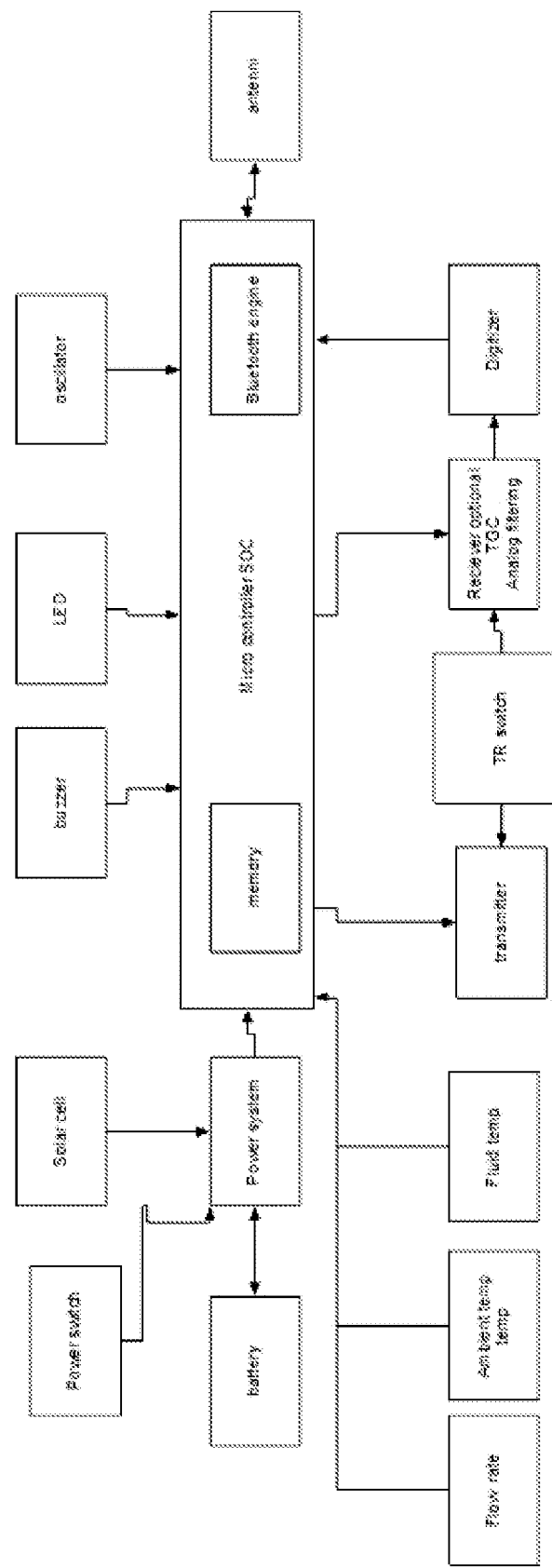
FIG. 1 is a schematic view of a an exemplary embodiment of the present invention.

The present invention generally relates to a fish finding sonar system. Specifically, this invention relates to a sonar device capable of being paired with a remote computing device to provide information to an angler about what is under the surface of the water. Embodiments of the present invention include a sonar device and a remote computing device configured to allow the sonar device to wirelessly communicate with the remote computing device and the remote computing device to connect to a remote computing system to register and receive information about real-time fishing hotspots.

According to an embodiment of the present invention, a system for fish finding may include a sonar device and a remote computing device. The system is designed to assist a fisherman in finding fish that are below the surface of the water by communicating information collected by the sonar device to the remote computing device. In addition to or in lieu of sonar data, the sonar device may be configured to collect one or more forms of information. One of ordinary skill in the art would appreciate that components of the system could be configured to collect a variety of different information, and embodiments of the present invention are contemplated for use with any form of collectable information.

According to an embodiment of the present invention, the system is configured to assist a fisherman in finding fish that are below the surface of the water by communicating information collected by the sonar device to a remote computing device. In a preferred embodiment, the method may be accomplished by collecting information from the one or more sensors present on or in the sonar device and processing that information on-board the sonar device. That processed information may then be communicated wirelessly to a remote computing device where the information can be displayed on the viewing screen of the remote computing device.

According to an embodiment of the present invention, a sonar device may be comprised of a housing, one or more sensors, a processor, a wireless communication means and a power source. Optionally, the sonar device may further include a storage device, an indicator light, an auditory signal or any combination thereof. The one or more sensors of the sonar device may include, but are not limited to, a thermometer, a speed sensor, an accelerometer, or any combination thereof. One of ordinary skill in the art would appreciate that there are numerous types of sensors that could be utilized with embodiments of the present invention, and embodiments of the present invention are contemplated for use with any type of sensor.

According to an embodiment of the present invention, the sonar device includes a housing. The housing is configured to retain the sonar sensor, processor, wireless communication means, power source and any other additional components. In a preferred embodiment, the housing is waterproof and constructed of plastic so that it will float efficiently at the surface of the water. One of ordinary skill in the art would appreciate that there are numerous sizes, shapes, and materials that could be utilized for the housing in the embodiments of the present invention and those embodiments of the present invention are contemplated for use with any of those options.

Figure 2:
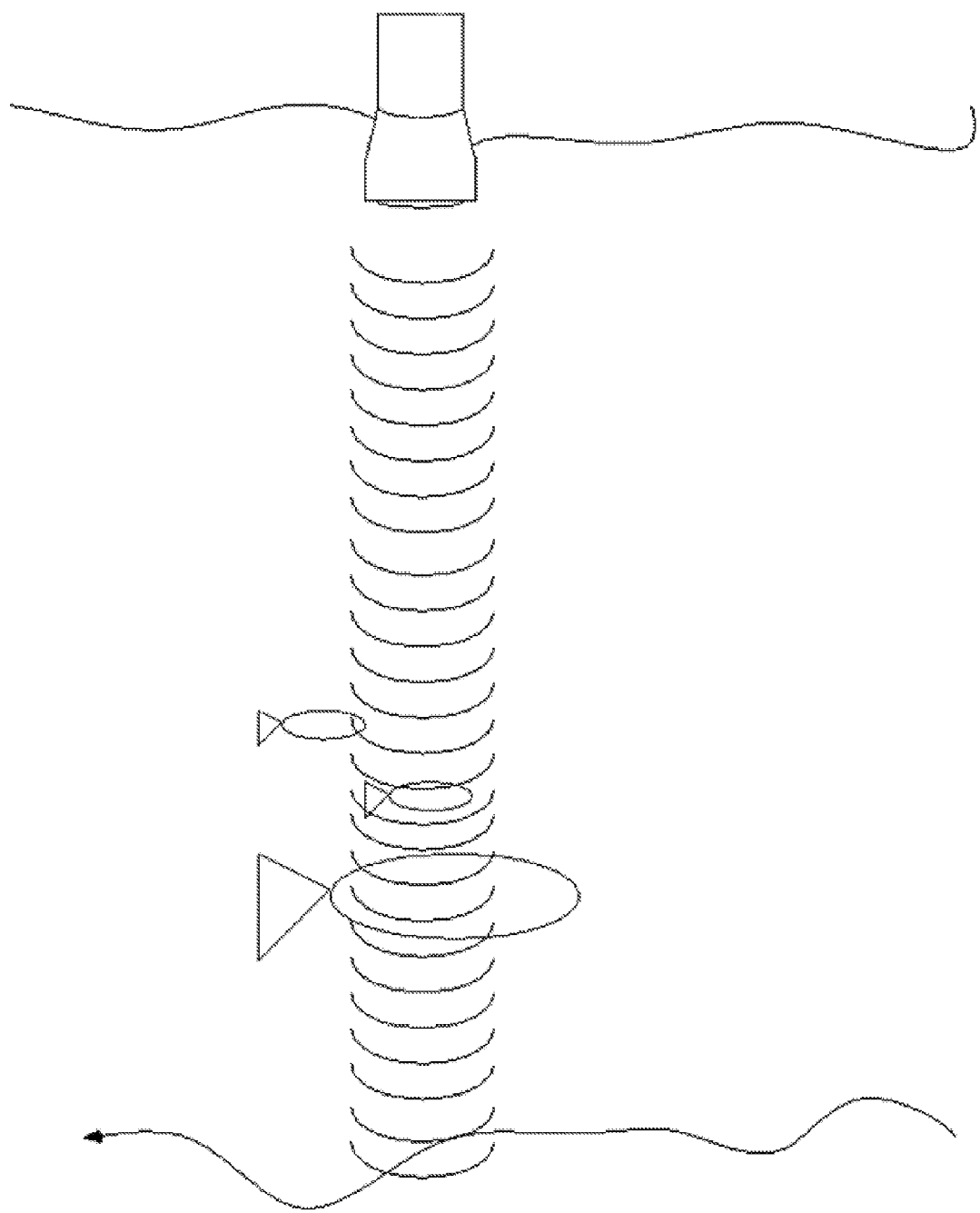
FIG. 2 is an illustration of an embodiment of the sonar device of the present invention.

Referring to FIG. 2, an illustration of an embodiment of the sonar device of the present invention, is shown. The sonar device includes a sonar sensor that sends and receives sonar waves to detect objects in the water. One of ordinary skill in the art would appreciate that there are numerous sonar sensors that could be utilized with embodiments of the present invention and embodiments of the present invention are contemplated for use with any sonar sensor.

According to an embodiment of the present invention, the sonar device includes a processor that is communicatively connected to the sonar sensor. The connection allows the sensor to provide raw sonar sensor information to the processor. The processor is configured to compute the raw sonar sensor information received from the sonar sensor and translate that information into a usable format. One of ordinary skill in the art would appreciate that there are numerous usable formats that could be utilized with embodiments of the present invention, and embodiments of the present invention are contemplated for use with any usable format.

According to an embodiment of the present invention, the sonar device includes a means of wireless communication. The wireless communication means is connected to the processor so that the processed information can be transmitted to the remote computing device. In a preferred embodiment, the wireless communications means may be low energy Bluetooth. In other embodiments, wireless communications means may include, but are not limited to, WI-FI, Bluetooth, ZigBee, ANT cellular means (e.g., CDMA, GSM) or any combination thereof. One of ordinary skill in the art would appreciate that there are numerous wireless communication means that could be utilized with embodiments of the present invention, and embodiments of the present invention are contemplated for use with any wireless communication means.

According to an embodiment of the present invention, the sonar device includes a power source. The power source provides power to the sonar sensor, processor, and wireless communication means, as well as any additional components. In a preferred embodiment, the power sources may be a rechargeable a battery. In certain embodiments, the battery may be rechargeable through a wired means. Alternatively, the battery may be recharged through a wireless means. In certain embodiments the power source may be replaceable. In other embodiments, the power source may feature solar recharging or other renewable energy means, including but not limited to, recharging through salinity and temperature sensors. One of ordinary skill in the art would appreciate that there are numerous power sources that could be utilized with embodiments of the present invention and embodiments of the present invention are contemplated for use with any power source.

According to an embodiment of the present invention, the sonar device includes an accelerometer. In one embodiment, the accelerometer may be configured to activate the sonar device when the accelerometer detects that the sonar device has been cast out on the line of a fishing rod. In yet another embodiment, the accelerometer may be configured to alert the fisherman that there is a fish at the end of the line through detection of sudden or rapid movements such as those generated when a fish tugs or otherwise pulls on a fishing line attached to a housing containing or integrated with the accelerometer. In certain embodiments, another possible configuration could be to incorporate the accelerometer into a fishing bobber, so that functionality of the device would be to detect whether a fish was one the line. One of ordinary skill in the art would appreciate that there are numerous functions that could be accomplished by the accelerometer and embodiments of the present invention are contemplated for use with any of those functions.

According to an embodiment of the present invention, the sonar device may include a storage device. In one embodiment, the storage device may be communicatively connected to the processor in order to provide for the logging of processed information. In another embodiment, the storage unit may also store data in case of a disconnection of wireless communication between the sonar device and the remote computing device. One of ordinary skill in the art would appreciate that there are numerous storage devices, including hard disk drives, solid state drives, random access memory and flash memory, that could be utilized with embodiments of the present invention and embodiments of the present invention are contemplated for use with any storage device.

According to an embodiment of the present invention, the sonar device may include a thermometer. In a preferred embodiment, a thermometer may sense the temperature of water and/or the air. In another embodiment, the thermometer could be utilized as recharging means for the power source. One of ordinary skill in the art would appreciate that there are numerous thermometers that could be utilized with embodiments of the present invention and embodiments of the present invention are contemplated for use with any thermometer.

According to an embodiment of the present invention, the sonar device may include a speed sensor. In a preferred embodiment, the speed sensor may be a propeller attached to the housing that could measure the speed of the water when the sonar device is tethered or pulled by the fisherman. One of the ordinary skill in the art would appreciate that there are numerous speed sensors that could be utilized with embodiments of the present invention and embodiments of the present invention are contemplated for use with any speed sensor.

According to an embodiment of the present invention, the sonar device may include a conductivity sensor. In a preferred embodiment, the conductivity sensor would sense the salinity of the water in which the sonar device floating. With the salinity of the water known, the input and/or output of the sonar sensor could be adjusted appropriately to account for the differing speeds of a sonar wave in fresh versus salt water. In another embodiment, the conductivity sensor could be utilized as recharging means for the power source. One of ordinary skill in the art would appreciate that there are numerous forms and functions that conductivity sensor might take on and embodiments of the present invention are contemplated for use with any of those forms and functions.

According to an embodiment of the present invention, the sonar device may include an indicator light to enable a fisherman to more easily identify the sonar device in the water. In one embodiment, the indicator light could be activated and deactivated remotely from a remote computing device. In another embodiment, the indicator light could flash when the sonar device becomes disconnected from the remote computing device. In yet another preferred embodiment, the indicator light could be configured to signal a low battery warning. One of ordinary skill in the art would appreciate that there are numerous forms and functions that indicator light might take on and embodiments of the present invention are contemplated for use with any of those forms and functions.

According to an embodiment of the present invention, the sonar device may include an auditory signal to assist in locating a sonar device when visual contact has been lost. In certain embodiments, the auditory signal could be activated and deactivated remotely from a remote computing device. In another embodiment, the auditory signal could sound when the sonar device becomes disconnected from the remote computing device. In yet another preferred embodiment, the auditory signal could be configured to indicate a low battery. One of ordinary skill in the art would appreciate that there are numerous forms and functions that the auditory signal might take on and embodiments of the present invention are contemplated for use with any of those forms and functions.

According to an embodiment of the present invention, the remote computing device may include a wireless communication means and a viewing means. Examples of remote computing devices include, but are not limited to, smartphones, tablet PCs, and laptops. One of ordinary skill in the art would appreciate that there are numerous remote computing devices that may be utilized with embodiments of the present invention, and embodiments of the present invention are contemplated for use with any remote computing device.

According to an embodiment of the present invention, the remote computing device includes a means of wireless communication. The wireless communication means allows the remote computing device to have bidirectional communication with the sonar device. In a preferred embodiment, the wireless communications means may be low energy Bluetooth. One of ordinary skill in the art would appreciate that there are numerous wireless communication means that could be utilized with embodiments of the present invention and embodiments of the present invention are contemplated for use with any wireless communication means.

According to an embodiment of the present invention, the communication means of the remote computing device might include access to one or more local area networks (LAN) or wide area networks (WAN) (e.g., the Internet). Access to remote networks, such as the Internet, could allow the remote computing device to upload information collected from the sonar device to the remote computing system where it could be processed for use by other fisherman and/or stored for other uses.

According to an embodiment of the present invention, the remote computing device includes a viewing screen. The viewing screen allows the remote computing device to display the information collected by the sonar device to the fisherman.

According to an embodiment of the present invention, the remote computing device does not include a viewing screen. In a preferred embodiment, such a remote computing device could be an additional sonar device or series of sonar devices that are communicatively linked together. The sonar devices would then collectively communicate with another remote computing device with a viewing screen (e.g., smartphone) to generate a larger sample of information than would one sonar device on its own.

According to an embodiment of the present invention, the remote computing device might include a global position system ("GPS"). In a preferred embodiment, the GPS could allow a fisherman to locate fishing hotspots or record locations identified by the sonar device as potential fishing hotspots. One of ordinary skill in the art would appreciate that are numerous functions that could be accomplished by GPS and embodiments of the present invention are contemplated for use with any of those functions.

According to an embodiment of the present invention, the remote computing device might include a camera. In a preferred embodiment, the camera could be used to allow a fisherman to photograph the fish and/or the fishing location. One of ordinary skill in the art would appreciate that there are numerous forms and functions that the camera might take on and embodiments of the present invention are contemplated for use with any of those forms and functions.

According to an embodiment of the present invention, the system herein described is configured to allow a fisherman to more easily locate and catch fish. In a preferred embodiment of the present invention, the sonar device is wirelessly paired with the remote computing device. The fisherman could then secure a fishing line to the sonar device and cast into the water. The sonar device, sensing that it was cast (e.g., through the use of an onboard accelerometer, through rapid change in the signal strength between the communications means of the sonar device and the communication means of the remote computing device), could then begin to collect information. Information, including, but not limited to, the presence of fish, bottom depth, water temperature, and air temperature, would be collected and processed on-board the sonar device. The processed information would then be communicated to the remote computing device via a low energy Bluetooth connection.

According to an embodiment of the present invention, the sonar device is configured to process the data from one or more sensors on board the sonar device. In this configuration, the sonar device is configured to handle processing of the raw sensor data from the one or more sensors into a format usable by one or more remote computing devices and encode the information for transmission to such remote computing devices in order to minimize the bandwidth used by the communications means of the sonar device and the various remote computing devices when sending the information to the remote computing device(s). In a preferred embodiment, on board data processing could be used to assist the sonar device in achieving more efficient power consumption. The sonar device would use power more efficiently by processing information from the one or more sensors on-board the device. More specifically, the sonar device could be configured to enter a low energy mode until sensor activity is detected. In a preferred embodiment the fisherman would be able to set the threshold level that is required before the sonar device becomes fully active for one or more of the one or more sensors present on the sonar device. When sensor activity reaches or exceeds the determined threshold level, the sonar device exits lower energy mode and would begin to process the sensor data and communicate information to the remote computing device.

According to an embodiment of the present invention, the remote computing device could receive processed information from the sonar device via the communication means on the remote computing device. The information received from the sonar device could then be displayed on the viewing screen of the remote computing device. The viewing screen could display information including, but not limited to, the depth of the water, the presence of fish, the size of the fish present, the depth of the fish, the temperature of the water, as well as other features present in the water. One of ordinary skill in the art would appreciate that there are numerous types of information that could be displayed on the viewing screen, and embodiments of the present invention are contemplated for use with the display of any type of information. In a preferred embodiment, the remote computing device could pair to multiple sonar devices dynamically, concurrently, or any combination thereof.

According to an embodiment of the present invention, the sonar device may be used for synthetic aperture sonar imaging. In a preferred embodiment, the sonar device could be pulled in some fashion including, but not limited to, by hand, by fishing reel, or by boat, over an area of water to collect data over that area. The collected data could then be analyzed to create a continuous sonar image of the area over which the sonar device was pulled.

According to an embodiment of the present invention, the embodiment that includes synthetic aperture sonar imaging requires that the sonar device be pulled at a knowable speed. In one embodiment of the present invention, the speed at which the sonar device is being pulled may be calculated based upon the rate at which the sonar device is being reeled in. In this embodiment, the reeling rate may be determined in a number of ways, including, but not limited to, a speedometer on the reel or calculation based upon the cranking ratio of the reel. In another one embodiment the speed of the sonar device may be measured by a flow sensor on the sonar device. One of ordinary skill in the art would appreciate that are numerous means by which the speed of the sonar device could be calculated and embodiments of the present invention are contemplated for use with any of those means.

According to an embodiment of the present invention, the remote computing device may be used to track and locate fishing hotspots through the provision and receipt of information to/from a remote computing system. In a preferred embodiment, the remote computing system is comprised of a server communicatively connected to one or more LANs or WANs and thereby communicatively connected to one or more remote computing devices. In certain embodiments, the remote computing system may receive information, including, but not limited to, location information (e.g., GPS coordinates, cellular triangulation data, manually entered location information), the presence of fish as identified by one or more sensors associated with one or more sonar devices, water temperature, weather conditions, time and date, and pictures. In a preferred embodiment, such information is provided by, the remote computing device, the sonar device or any combination thereof.

According to an embodiment of the present invention, the remote computing system could place the information it receives into a central data store (e.g., database) communicatively connected to the remote computing system. The remote computing system may further be configured to utilize information provided to it from the remote computing devices and sonar devices to generate information regarding various fishing locations. For instance, the remote computing system could utilize information received from the aforementioned sources to develop "hotspot" data identifying whether certain locations are particularly good or poor choices for fishing. This hotspot information may be based on any number of criteria, including, but not limited to, time of day, time of year, average size of fish, water temperature, tide fluctuations, or any combination thereof. One of ordinary skill in the art would appreciate that there are numerous types of data that may be utilized in developing hotspots, and embodiments of the present invention are contemplated for use with any type of data.

According to an embodiment of the present invention, once the hotspot information is generated, the remote computing system may be configured to transmit hotspot information to one or more remote computing devices, thereby allowing fishermen to locate, in real-time, the best place to fish. The more information the remote computing system is provided on a location, the more confidently the remote computing system can identify locations were other fishermen have had the most successful fishing or sensors have identified the most number of fish, fish of a certain size or other criteria associated with a hotspot.

According to an embodiment of the present invention, the remote computing system may also assist in the recovery of a lost sonar device. In a preferred embodiment, the remote computing system would receive a notification from a fisherman that a sonar device has been lost. The remote computing system could then send a notice to other fishermen that are connected to or otherwise utilizing the remote computing system that informs those fishermen of the lost sonar device. If and when the sonar device is found, it may be returned to the proper owner based on the unique identification number of the sonar device that is recorded when the sonar device is initially registered with the remote computing system.

Figure 5:
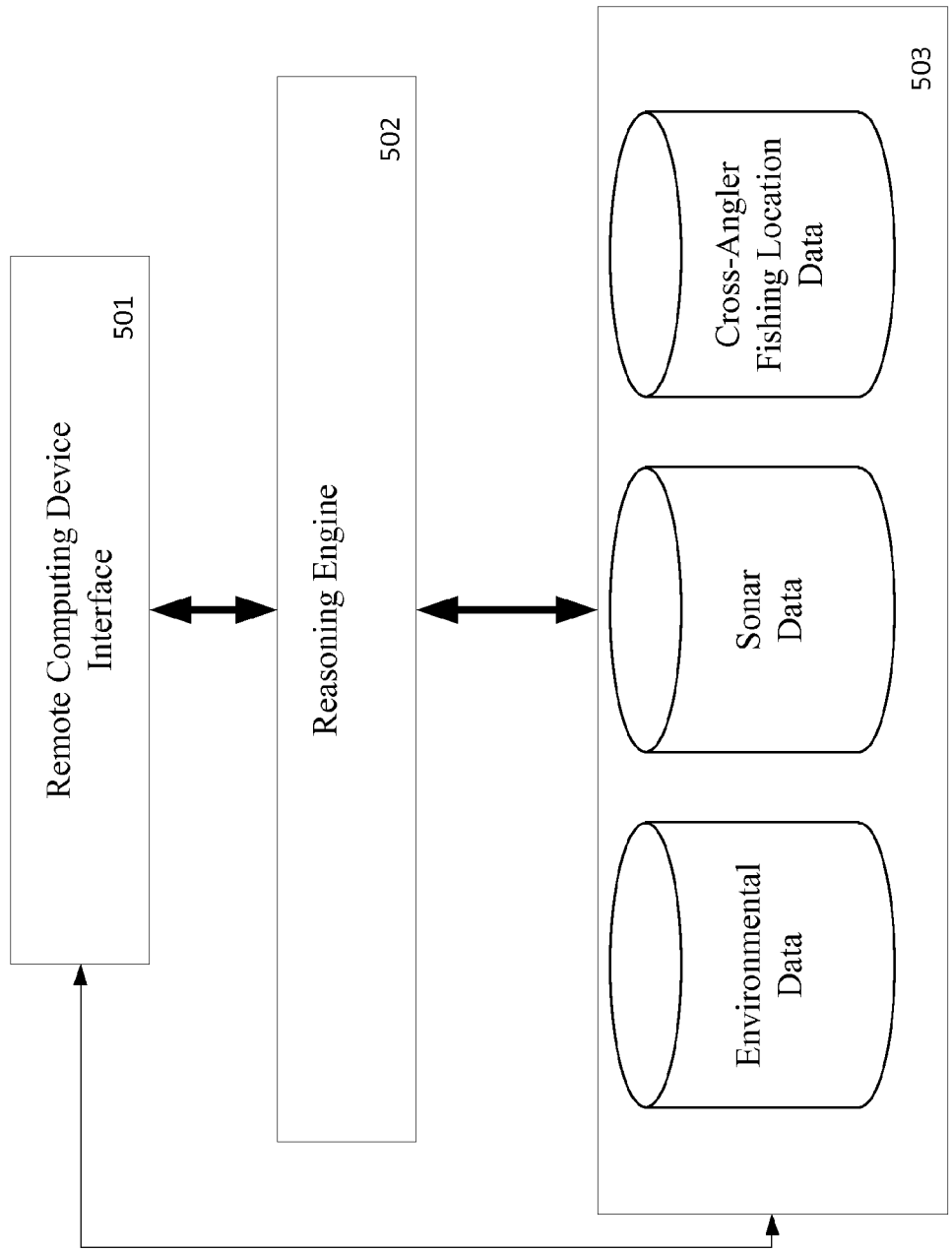
FIG. 5 is a schematic overview of a remote computing system, in accordance with a preferred embodiment on the present invention.

Referring to FIG. 5, a schematic overview of a remote computing system according to a preferred embodiment, is shown. In this embodiment, a remote computing system is comprised of a remote computing device interface 501, a reasoning engine 502, and one or more data stores 503.

According to an embodiment of the present invention, the remote computing system includes a remote computing device interface 501. In a preferred embodiment, the remote computing device interface would be an application programming interface ("API") or other interface capable of receiving information from and transmitting information to a remote computing device. One of ordinary skill in the art would appreciate that there are numerous types of remote computing device interfaces 502 that might be utilized with embodiments of the present invention, and embodiments of the present invention are contemplated for use with any type of remote computing device interface.

According to an embodiment of the present invention, the remote computing system employs a reasoning engine 502. In a preferred embodiment, the reasoning engine 502 receives and analyzes various data points from sources including, but not limited to, one or more data stores 503, a sonar device, one or more remote computing device interfaces 501 and the internet to generate hotspot information.

According to an embodiment of the present invention, the reasoning engine determines what points of fishing data are available. Fishing data points may include, but are not limited to, fish activity, water temperature, water depth, water salinity, air temperature, weather conditions, location, and lunar phase. The reasoning engine could then create an independent variable from each available point of fishing data. In a preferred embodiment, the reasoning engine would be able to determine what points of fishing data are available from a variety of sources, including, but not limited to, the data store 503 of the remote computing system, data collected in real-time by one or more sonar devices, and the internet.

According to an embodiment of the present invention, the reasoning engine can generate an initial base model based upon the available fishing data points. Each available point of fishing data (or any subset thereof) could be assigned as an independent variable that could be used for the purposes of generating hotspot information. The reasoning engine would generate hotspot information by comparing real-time fishing data points to those of the initial base model. As with the initial base model, the real-time fishing data points could be collected from multiple sources, including but not limited to one or more sonar devices and the internet.

According to an embodiment of the present invention, the remote computing system may include one or more data stores 503 configured to store data points and transmit data points to a reasoning engine 502 or a remote computing device interface 501. In a preferred embodiment, the data store would further be configured to log data related to hotspot information generated by the reasoning engine 502. One of ordinary skill in the art would appreciate that there are numerous types of data stores that might be utilized with the remote computing system, and embodiments of the present invention are contemplated for use with any type of data store.

According to an embodiment of the present invention, a method for generating hotspot information is provided. The method is intended to identify predicted fishing trends for given locations to a fisherman. The method is accomplished by analyzing past and present values of various data points and generating hotspot information based upon that analysis. Data points for use in generating hotspot information may include, but are not limited to, fish activity, water temperature, water depth, water salinity, air temperature, weather conditions, location, and lunar phase. One of ordinary skill in the art would appreciate that there are numerous types of data points that could be utilized to generate hotspot information, and embodiments of the present invention are contemplated for use with any type of data points.

According to an embodiment of the present invention, the hotspot information may be logged in a data store for later use and retrieval by the system. In a preferred embodiment, the hotspot information would be saved in the data store for future use by the system where historical data could be used to validate or improve upon newly added or received information about one or more hotspots. One of ordinary skill in the art would appreciate that there are numerous methods for logging hotspot information in a data store and embodiments of the present invention are contemplated for use with any such method for logging hotspot information.

Exemplary Embodiments

Figure 3:
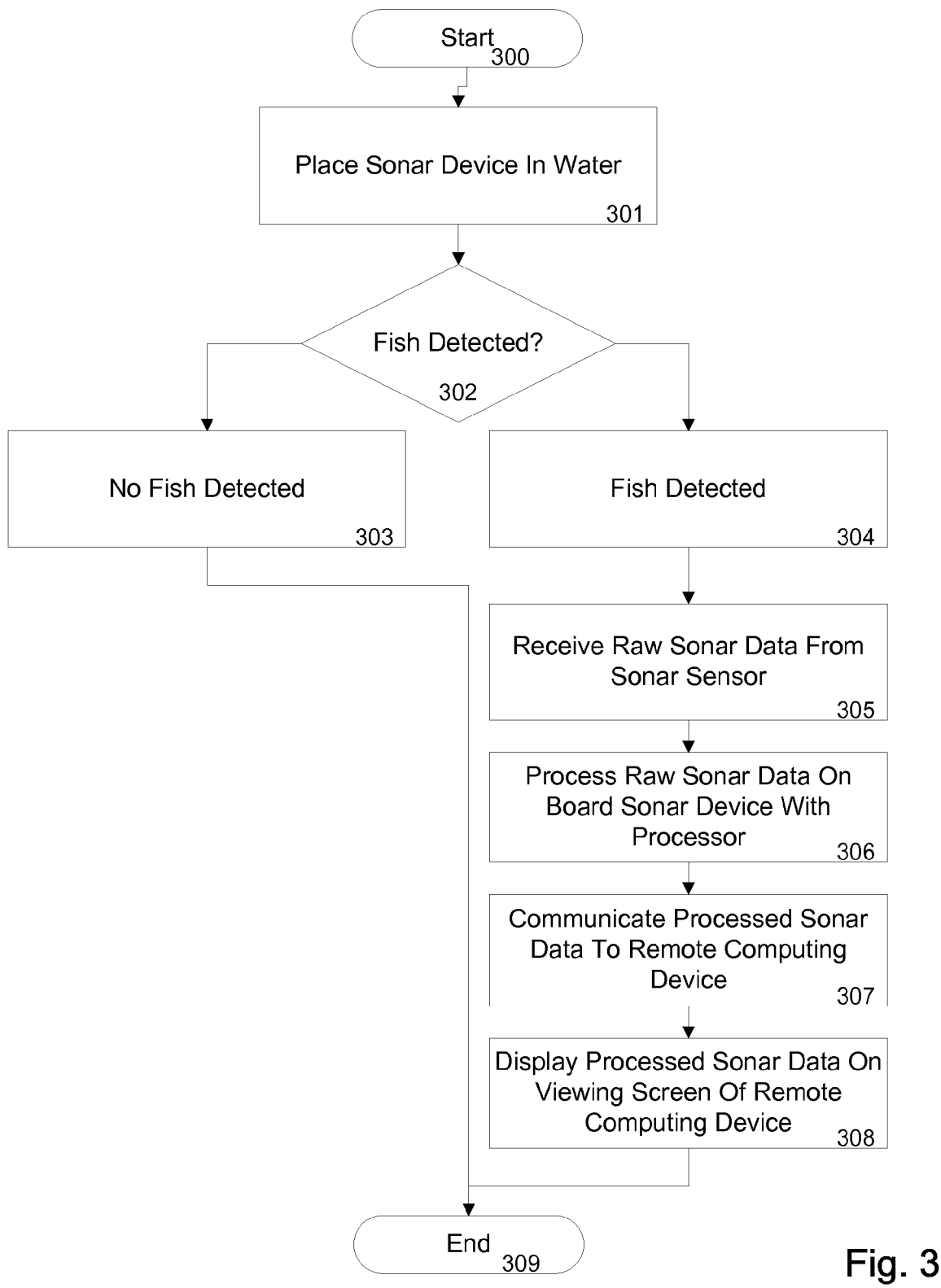
FIG. 3 is a process flow of an exemplary method for finding fish using a sonar device and a remote computing device, in accordance with an embodiment of the present invention.

The following is an exemplary embodiment of a method finding fish using a sonar device and a remote computing device, as show in FIG. 3. At step 300, the sonar device is prepared for deployment by securing a fishing line to the sonar device.

At step 301, the sonar device is place into the water. The sonar device can be placed into the water via casting with a fishing rod or deployed by hand.

At step 302, the sonar device will send sonar pulses into the water to detect the presence of fish. The sonar pulses are generally generated by the sonar sensor onboard the sonar device.

At step 303, the sonar device does not detect any fish and goes into a low energy state until the presence of fish is detected. In this low energy state, the sonar sensor continued to operate by sending out sonar pulses until such time as fish are detected by the sonar sensor.

At step 304, the sonar device detects the presence of fish and if in low energy mode returns to fully functional state. The sonar sensor continuously sends sonar pulses and creates raw sonar data from any returns. Exiting of the low energy mode may also include activating various other sensors on the sonar device and the processor such that it is actively awaiting the raw sonar data from the sonar sensor.

At step 305, the raw sonar data is received from the sonar sensor by the processor on board the sonar device. The raw sonar data may be received by the processor, for instance, as a stream of data or in batches. One of ordinary skill in the art would appreciate that there are numerous ways in which the raw sonar data may be received by the processor, and embodiments of the present invention are contemplated for use with any form of receiving raw sonar data at the processor.

At step 306, the raw sonar data from the sonar sensor is processed on board the sonar device by the processor. The raw sonar data is processed and encoded to produce processed sonar data in which the various elements of the raw sonar data are converted into useful representations of the relevant information contained in the raw sonar data (e.g., number of fish present, size of fish identified).

At step 307, the processed sonar data is communicated by the wireless communication means of the sonar device to the wireless communication means of the remote computing device. As noted above, the preferred embodiment for a wireless communication means is low energy Bluetooth. However, the processed sonar data may be transmitted via any form of wireless communication means.

At step 308, the remote computing device has received the processed sonar data and displays the processed sonar data on the display component of the remote computing device. As noted above, the remote computing device can take a variety of forms.

At step 309, the process terminates. Alternatively, the process can loop back to step 302 until the sonar device is power off or is removed from the water.

Figure 4:
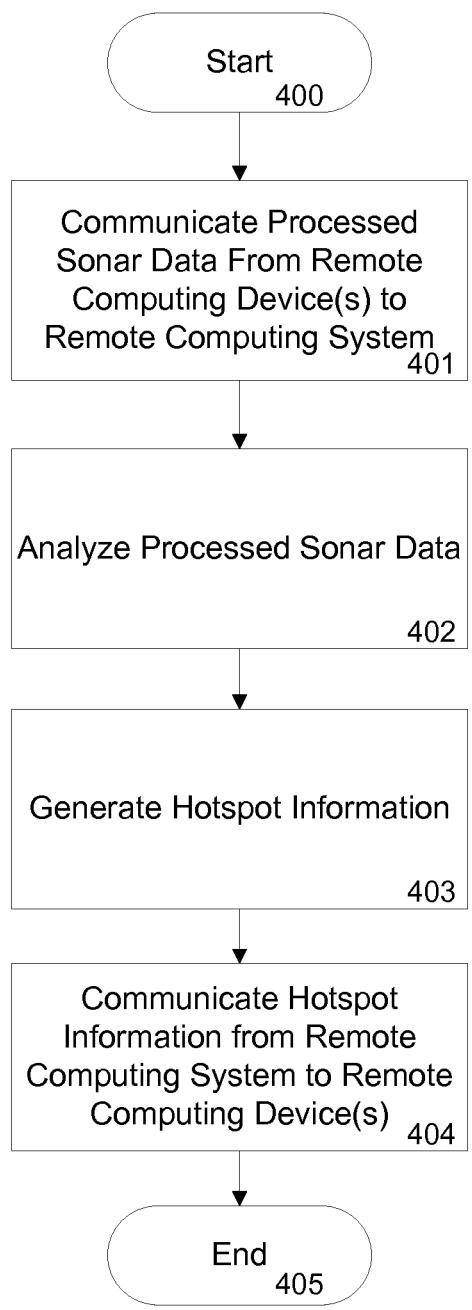
FIG. 4 is a process flow of an exemplary method for generating hotspot information, in accordance with an embodiment of the present invention.

The following is an exemplary embodiment of a method for generating hotspot information, as shown in FIG. 4. At step 400, the process initiates with the remote computing device receiving processed sonar data from the sonar device.

At step 401, the remote computing device communicates processed sonar data to the remote computing system. The remote computing system is capable of receiving such data from one or more remote computing devices.

At step 402, the remote computing system analyzes the processed sonar data that it has received from one or more remote computing devices. The remote computing system analyzes the data to ascertain what fish spots are the most active and productive based on preconfigured criteria set on the remote computing system.

At step 403, the remote computing system generates hotspot information based upon the analysis of the processed sonar data it received from one or more remote computing devices. The hotspot information could include, but is not limited to, fishing spot location, number and size of fish present, water depth, temperature, and current weather. The data that is collected can be viewed in real-time so that a fisherman can get the most current information as to where the best fishing locations are. Additionally, the remote computing system can catalog the information that it receives so historical trends can be analyzed by the system in order to develop probabilistic and deterministic analysis of various hotspot locations.

At step 404, the remote computing system communicates the hotspot information to one or more remote computing devices. The delivery of hotspot information can be pushed to various remote computing devices or otherwise requested by various remote computing devices based on search criteria or other request criteria.

At step 405, the process terminates. Alternatively, process can continue as long as one or more remote computing devices are in communication with the remote computing system.

Figure 6:
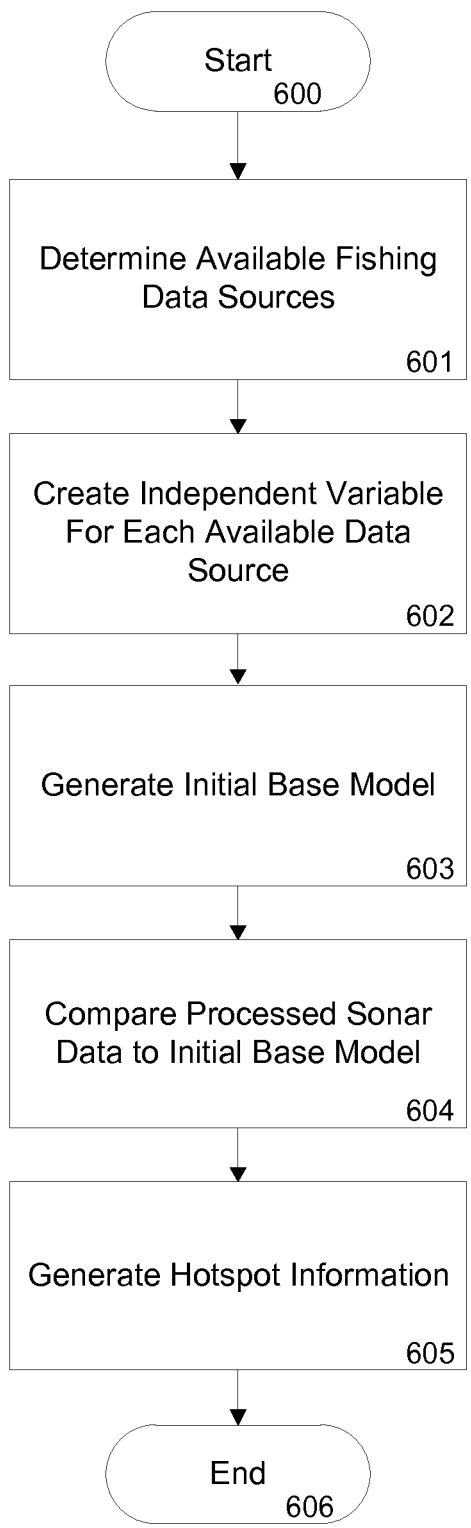
FIG. 6 is a process flow of an exemplary method for generating hotspot information, in accordance with an embodiment of the present invention.

The following is an exemplary embodiment of a method for generating hotspot information, as shown in FIG. 6. At step 601, the process initiates with the reasoning engine determining what points of fishing data are available. Available data points include, but are not limited to, the presence of fish, water temperature, water depth, air temperature, and location.

At step 602, the reasoning engine creates an independent variable for each of the available fishing data points. The available data points can be the time real-time fishing data collected by the sonar device or from historical fishing data logged in a data store.

At step 603, the reasoning engine generates an initial base model. The initial base model can be generated the real time fishing data collected by the sonar device or the fishing data logged in the data store.

At step 604, the reasoning engine compares the initial base model to real-time fishing data collected by the sonar device.

At step 605, the reasoning engine generates hotspot information based on the comparison of the initial base model and the real-time fishing data. Portions of the hotspot information may identify and predict fishing trends for fishing locations.

At step 606, the process terminates. The hotspot information that has been generated can be logged in the data store for future reference.

Throughout this disclosure and elsewhere, block diagrams and flowchart illustrations depict methods, apparatuses (i.e., systems), and computer program products. Each element of the block diagrams and flowchart illustrations, as well as each respective combination of elements in the block diagrams and flowchart illustrations, illustrates a function of the methods, apparatuses, and computer program products. Any and all such functions ("depicted functions") can be implemented by computer program instructions; by special-purpose, hardware-based computer systems; by combinations of special purpose hardware and computer instructions; by combinations of general purpose hardware and computer instructions; and so on—any and all of which may be generally referred to herein as a "circuit," "module," or "system."

While the foregoing drawings and description set forth functional aspects of the disclosed systems, no particular arrangement of software for implementing these functional aspects should be inferred from these descriptions unless explicitly stated or otherwise clear from the context.

Each element in flowchart illustrations may depict a step, or group of steps, of a computer-implemented method. Further, each step may contain one or more sub-steps. For the purpose of illustration, these steps (as well as any and all other steps identified and described above) are presented in order. It will be understood that an embodiment can contain an alternate order of the steps adapted to a particular application of a technique disclosed herein. All such variations and modifications are intended to fall within the scope of this disclosure. The depiction and description of steps in any particular order is not intended to exclude embodiments having the steps in a different order, unless required by a particular application, explicitly stated, or otherwise clear from the context.

Traditionally, a computer program consists of a finite sequence of computational instructions or program instructions. It will be appreciated that a programmable apparatus (i.e., computing device) can receive such a computer program and, by processing the computational instructions thereof, produce a further technical effect.

A programmable apparatus includes one or more microprocessors, microcontrollers, embedded microcontrollers, programmable digital signal processors, programmable devices, programmable gate arrays, programmable array logic, memory devices, application specific integrated circuits, or the like, which can be suitably employed or configured to process computer program instructions, execute computer logic, store computer data, and so on. Throughout this disclosure and elsewhere a computer can include any and all suitable combinations of at least one general purpose computer, special-purpose computer, programmable data processing apparatus, processor, processor architecture, and so on.

It will be understood that a remote computing device, remote computing system or other computer can include a computer-readable storage medium and that this medium may be internal or external, removable and replaceable, or fixed. It will also be understood that a computer can include a Basic Input/Output System (BIOS), firmware, an operating system, a database, or the like that can include, interface with, or support the software and hardware described herein.

Embodiments of the system as described herein are not limited to applications involving conventional computer programs or programmable apparatuses that run them. It is contemplated, for example, that embodiments of the invention as claimed herein could include an optical computer, quantum computer, analog computer, or the like.

Regardless of the type of computer program or computer involved, a computer program can be loaded onto a computer to produce a particular machine that can perform any and all of the depicted functions. This particular machine provides a means for carrying out any and all of the depicted functions.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program instructions can be stored in a computer-readable memory capable of directing a computer or other programmable data processing apparatus to function in a particular manner. The instructions stored in the computer-readable memory constitute an article of manufacture including computer-readable instructions for implementing any and all of the depicted functions.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

The elements depicted in flowchart illustrations and block diagrams throughout the figures imply logical boundaries between the elements. However, according to software or hardware engineering practices, the depicted elements and the functions thereof may be implemented as parts of a monolithic software structure, as standalone software modules, or as modules that employ external routines, code, services, and so forth, or any combination of these. All such implementations are within the scope of the present disclosure.

In view of the foregoing, it will now be appreciated that elements of the block diagrams and flowchart illustrations support combinations of means for performing the specified functions, combinations of steps for performing the specified functions, program instruction means for performing the specified functions, and so on.

It will be appreciated that computer program instructions may include computer executable code. A variety of languages for expressing computer program instructions are possible, including without limitation C, C++, Java, JavaScript, assembly language, Lisp, and so on. Such languages may include assembly languages, hardware description languages, database programming languages, functional programming languages, imperative programming languages, and so on. In some embodiments, computer program instructions can be stored, compiled, or interpreted to run on a computer, a programmable data processing apparatus, a heterogeneous combination of processors or processor architectures, and so on. Without limitation, embodiments of the system as described herein can take the form of web-based computer software, which includes client/server software, software-as-a-service, peer-to-peer software, or the like.

In some embodiments, a computer enables execution of computer program instructions including multiple programs or threads. The multiple programs or threads may be processed more or less simultaneously to enhance utilization of the processor and to facilitate substantially simultaneous functions. By way of implementation, any and all methods, program codes, program instructions, and the like described herein may be implemented in one or more thread. The thread can spawn other threads, which can themselves have assigned priorities associated with them. In some embodiments, a computer can process these threads based on priority or any other order based on instructions provided in the program code.

Unless explicitly stated or otherwise clear from the context, the verbs "execute" and "process" are used interchangeably to indicate execute, process, interpret, compile, assemble, link, load, any and all combinations of the foregoing, or the like. Therefore, embodiments that execute or process computer program instructions, computer-executable code, or the like can suitably act upon the instructions or code in any and all of the ways just described.

The functions and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, embodiments of the invention are not described with reference to any particular programming language. It is appreciated that a variety of programming languages may be used to implement the present teachings as described herein, and any references to specific languages are provided for disclosure of enablement and best mode of embodiments of the invention. Embodiments of the invention are well suited to a wide variety of computer network systems over numerous topologies. Within this field, the configuration and management of large networks include storage devices and computers that are communicatively coupled to dissimilar computers and storage devices over a network, such as the Internet.

While multiple embodiments are disclosed, still other embodiments of the present invention will become apparent to those skilled in the art from this detailed description. The invention is capable of myriad modifications in various obvious aspects, all without departing from the spirit and scope of the present invention. Accordingly, the drawings and descriptions are to be regarded as illustrative in nature and not restrictive.

The invention claimed is:

1. A fish detection system comprising:
a sonar fishing float, and
a remote computing system;
wherein said sonar fishing float comprises:
a sonar sensor,
a processor,
a wireless communication means,
a power source, and
a housing;
wherein said housing is configured to retain said sonar sensor, said processor, said wireless communications means, and said power source;
wherein said processor is configured to process said sonar data received from said sonar sensor and extract fish location data from said sonar data;
wherein said processor is communicatively connected to said wireless communication means;
wherein said wireless communication means is configured to transmit said fish location data; and
wherein said remote computing system is configured to:
receive said fish location data;
receive geographic location data corresponding to said fish location data; and
determine hotspot information based at least on a geographic location associated with said fish location data.

2. The system of claim 1, wherein said sonar device further comprises a storage device.

3. The system of claim 1, wherein said sonar device further comprises an accelerometer.

4. The system of claim 1, wherein said sonar device further comprises an indicator light.

5. The system of claim 1, wherein said sonar device further comprises an auditory signal.

6. The system of claim 1, wherein said sonar device further comprises a thermometer.

7. The system of claim 1, wherein said sonar device further comprises a speed sensor.

8. The system of claim 1, wherein said sonar device further comprises a conductivity sensor.

9. The system of claim 1, wherein said sonar device further comprises synthetic aperture sonar imaging.

10. The system of claim 1, wherein said first wireless communications means uses a communication standard defined by an IEEE 802 wireless communications standard.

11. The system of claim 1, wherein said power source is rechargeable.

12. The system of claim 1, wherein said housing is plastic.

13. The system of claim 1, wherein said housing is waterproof.

14. A computer implemented method for fish finding using sonar and a remote computing system, the method comprising:
collecting sonar data at a sonar sensor of a sonar device;
processing sonar data at a processor of said sonar device to extract fish location data;
transmitting said fish location data from said sonar device;
receiving, at a remote computing system, said fish location data;
receiving, at said remote computing system, geographic location data corresponding to said fish location data;
analyzing said geographic location data and said fish location data at said remote computing system to determine fishing hotspot information; and
communicating said hotspot information from said remote computing system to one or more remote computing devices.

15. A computer implemented method for generating fishing hotspot information based on sonar data, the method comprising the steps of:
receiving, at a remote computing system, data of fish found produced by one or more sonar fishing floats;
receiving, at said remote computing system, geographic location data corresponding to where said one or more sonar fishing floats produced said data of fish found; and
correlating, through a reasoning engine at said remote computing system, said data of fish found and said geographic location data to determine fishing hotspot information.

16. The method of claim 15, further comprising the step of sending said fishing hotspot information to one or more mobile computing devices.

17. The computer implemented method of claim 15 further comprising the steps of:
receiving fishing data points;
creating an independent variable for each fishing data point;

generating a historical base model based on said correlation of geographic location and data of fish found and additionally on one or more of said independent variables;
receiving current fishing data points;
comparing said current fishing data points to similar fishing data points in said historical base model;
determining predicted fishing trends for a geographic location based on at least one of said current additional fishing data points; and
sending said predicted fishing trends to one or more mobile computing devices.

* * * * *